Patented Apr. 21, 1925.

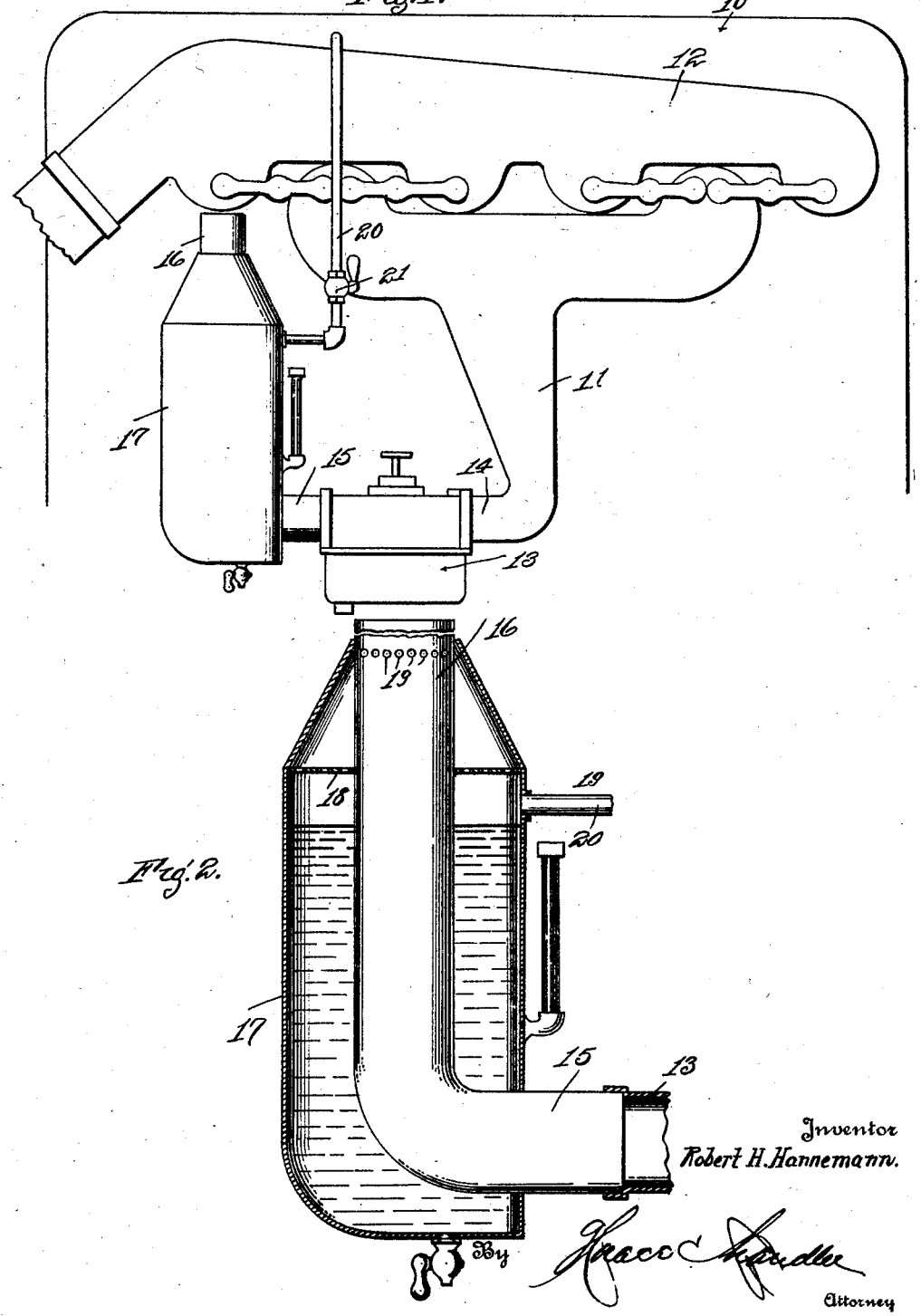

1,534,381

UNITED STATES PATENT OFFICE.

ROBERT H. HANNEMANN, OF WAUSAU, WISCONSIN.

AIR-MOISTENING DEVICE FOR ENGINES.

Application filed March 27, 1924. Serial No. 702,361.

*To all whom it may concern:*

Be it known that I, ROBERT H. HANNEMANN, a citizen of the United States, residing at Wausau, in the county of Marathon, State of Wisconsin, have invented certain new and useful Improvements in Air-Moistening Devices for Engines; and I do hereby declare the following to be a full, clear, and exact description of the invention, such as will enable others skilled in the art to which it appertains to make and use the same.

This invention relates to new and useful improvements in moistening devices, and particularly to devices for feeding moisture to the engine through the carburetor.

One object of the invention is to provide a device whereby hot moist air is sucked into, and passed through the carburetor, prior to the entry of the gas mixture into the intake manifold.

Another object is to provide a water container so located that it is heated by the heat radiated from the exhaust manifold, hot air being drawn from the vicinity of the manifold through the water container, and furnished to the carburetor, through the suction induced through the carburetor by the pistons of the engine.

Other objects and advantages will be apparent from the following description when taken in connection with the accompanying drawing.

In the drawing:

Figure 1 is an elevation of a portion of an internal combustion engine, showing the invention applied thereto.

Figure 2 is a similar view, but showing the attachment in section, and the greater part of the engine omitted.

Referring particularly to the accompanying drawing, 10 represents a portion of an engine, 11 the intake manifold, 12 the exhaust manifold, and 13 the carburetor. The carburetor is connected with the intake manifold, in the usual manner, by the pipe 14. From the other side of the carburetor there extends a pipe 15, which is L-shaped in outline, the end of the horizontal leg being connected with the carburetor, while the vertical leg 16 extends to a point in close proximity to the exhaust manifold 12. The pipe 15 is disposed within a cylindrical water containing tank 17, with the vertical leg extending through the center of the conical top of the tank, and the horizontal leg extending through the side of the tank, adjacent the bottom. Thus the greater part of the pipe is submerged in the water in the tank. Extending horizontally across the tank, at the bottom of the conical top, is a perforated baffle plate 18, which serves to prevent splashing of the water, when the automobile passes over rough roads. The apex of the conical top is effectively sealed to the pipe 15, while the side wall of the tank is similarly secured to the horizontal leg of the pipe. In the vertical leg of the pipe 15, a short distance below the point of connection of the top of the tank with said leg, there are formed the circular series of openings 19. Connected to the side of the tank, just below the baffle plate 18, is a comparatively small pipe 20, the other end of said pipe being connected with a portion of the water jacket of the engine, whereby to keep the tank 17 supplied with water. In this pipe 20 is arranged a cut-off valve 21, so that water may be cut off from the supply to prevent overflowing through the openings 19, and passing directly to the carburetor.

In the operation of the device, the heated air, from the vicinity of the exhaust pipe is drawn down through the pipe 15, and through the carburetor. The passage of the hot air, through the pipe 15, creates a suction in the upper portion of the tank 17, causing the steam which arises from the water, to be drawn out with the air, into the pipe, and passed on through the carburetor to the intake manifold. The constant passage of hot air through the pipe 15, causes the water in the tank 17 to be raised to the vapor point, such vapor escaping through the openings 19 into the pipe 15.

What is claimed is:

1. The combination with an internal combustion engine, of a water receptacle, an angular conduit disposed within the receptacle and having one end extending through the side of the receptacle and connected with the carburetor of the engine, the other end of the conduit being open and disposed in close proximity to the exhaust manifold of the engine to receive heated air, a foraminous baffle in the receptacle above the water level, the end of the receptacle adjacent said manifold being tapered, the portion of the conduit inwardly of the said tapered end of the receptacle being perforated to draw vapor from the receptacle under the suction induced through the carburetor by the pistons of the engine.

2. A moisture feeding attachment for an internal combustion engine comprising a tank having its upper end conical in form and arranged to contain water, said tank having an opening in the side adjacent the bottom, and an L-shaped pipe disposed in the receptacle and having the upper end of its vertical leg protruding through and secured within the apex of the conical end of the receptacle and the end of its horizontal leg protruding through and secured within the said side opening of the tank, the said upper end of the pipe being open and the said other end of the pipe being secured to a carburetor, the portion of the vertical leg, inwardly of the conical end being perforated.

In testimony whereof, I affix my signature, in the presence of two witnesses.

ROBERT H. HANNEMANN.

Witnesses:
EMIL E. KRETLOW,
FRANK JAECKS.